United States Patent
Bastaldo-Tsampalis et al.

(10) Patent No.: US 9,319,858 B2
(45) Date of Patent: Apr. 19, 2016

(54) MANAGING INFORMATION ABOUT CONTENT TRANSMISSION

(71) Applicant: CELLCO PARTNERSHIP, Basking Ridge, NJ (US)

(72) Inventors: Brigitte Bastaldo-Tsampalis, Bridgewater, NJ (US); Ashfaq Kamal, Norristown, PA (US); Manuel Enrique Caceres, Basking Ridge, NJ (US); Yuk Lun Li, Morganville, NJ (US); Praveen Venkataramu, Bridgewater, NJ (US); Asif Nooruddin Batada, Marietta, GA (US)

(73) Assignee: Cellco Partnership, Basking Ridge, NJ (US)

( * ) Notice: Subject to any disclaimer, the term of this patent is extended or adjusted under 35 U.S.C. 154(b) by 146 days.

(21) Appl. No.: 13/933,067

(22) Filed: Jul. 1, 2013

(65) Prior Publication Data

US 2015/0005020 A1    Jan. 1, 2015

(51) Int. Cl.
*H04W 4/00* (2009.01)
*H04W 4/20* (2009.01)
*H04W 4/02* (2009.01)

(52) U.S. Cl.
CPC .............. *H04W 4/20* (2013.01); *H04W 4/008* (2013.01); *H04W 4/02* (2013.01)

(58) Field of Classification Search
CPC .................................. H04W 4/12; H04W 4/14
USPC .............. 455/466, 41.1, 41.2, 411; 705/14.45
See application file for complete search history.

(56) References Cited

U.S. PATENT DOCUMENTS

| | | | |
|---|---|---|---|
| 2010/0161410 A1* | 6/2010 | Tulloch | 705/14.45 |
| 2013/0102248 A1* | 4/2013 | Jay et al. | 455/41.1 |
| 2013/0171928 A1* | 7/2013 | Nahidipour | 455/41.1 |
| 2013/0217333 A1* | 8/2013 | Sprigg et al. | 455/41.2 |

* cited by examiner

Primary Examiner — Chuck Huynh

(57) ABSTRACT

Systems and methods for managing information about content transmission are disclosed. In some implementations, a first mobile device communicates with a second mobile device, via a short-range radio of the first mobile device, to either send or receive a content item. The first mobile device tags the content item with a tag. The tag identifies the second mobile device. The first mobile device transmits to a server, via an additional radio of the first mobile device, data identifying the content and the second mobile device. The additional radio is different from the short-range radio. The data is transmitted to the server for analyzing short-range radio transmissions between mobile devices.

21 Claims, 6 Drawing Sheets

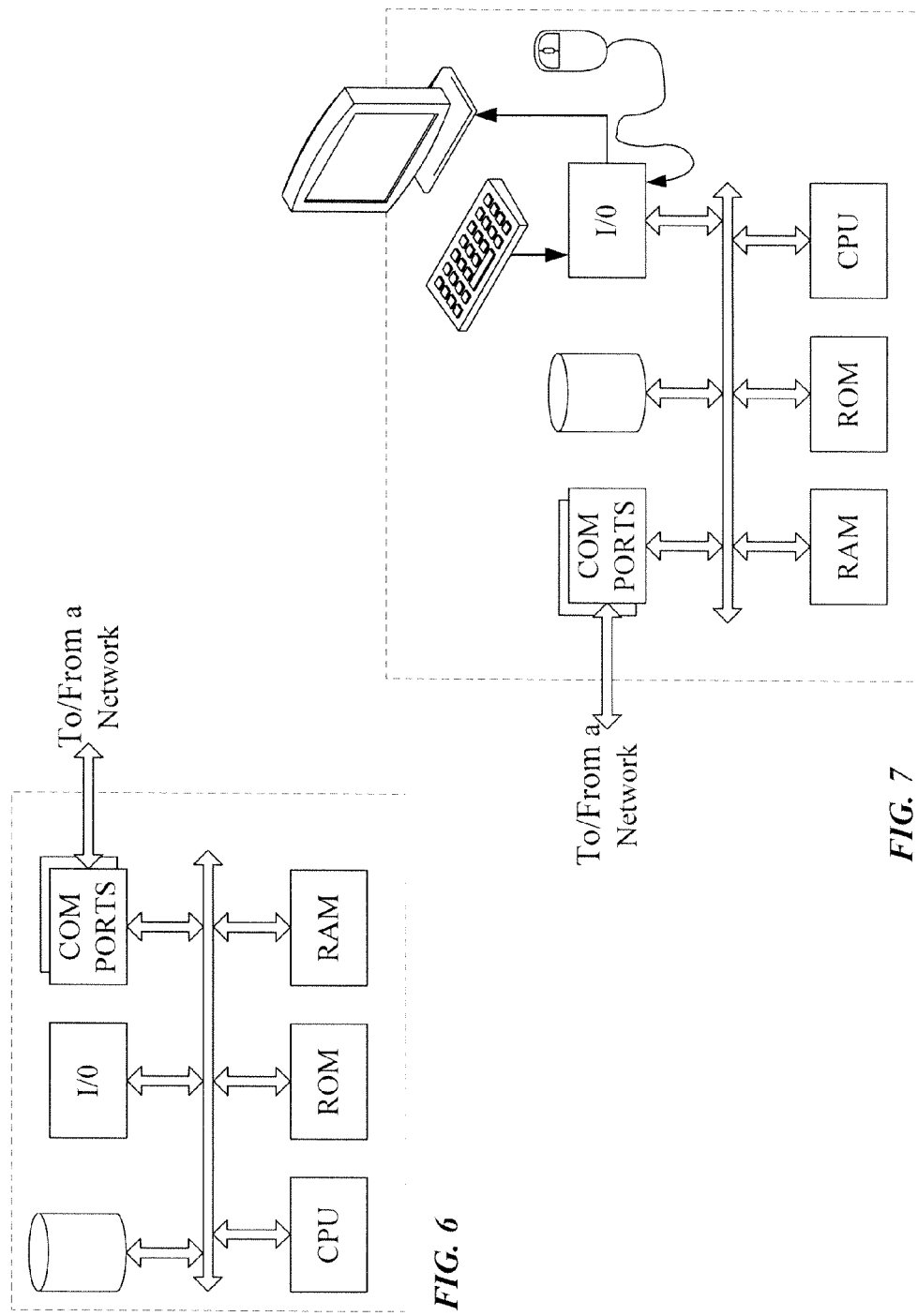

MANAGING INFORMATION ABOUT CONTENT TRANSMISSION

BACKGROUND

Many mobile devices (e.g., mobile phones, tablet computers, personal digital music players, tablet computers, laptop computers, etc.) are configured to send and receive information over a network (e.g., a cellular network or a WiFi network) using a network connection radio, which may include a transmitter and a receiver, and to send and receive information shared with other local mobile device(s) using a short-range radio (e.g., a near field communication radio, a Bluetooth® radio, or local content sharing over WiFi).

When information is shared (e.g., sent or received) over the network, a service provider (e.g., a cellular service provider, a manufacturer of the mobile device, a developer of an application, or other service providers having access to the network) may receive information about the content that is being shared. The service provider may utilize this information to analyze the virality or popularity of content or to charge provider(s) of content (e.g., advertisements or coupons) based on the sharing of the content. However, when information is shared using the short-range radio, the service provider may not be notified about the sharing, as the service provider may not be located locally to the mobile device(s) involved in the short-range radio communication sharing. The service provider may be interested in the content sharing for the reasons set forth above. As the foregoing illustrates, a new approach for managing information about content sharing may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 is a simplified functional block diagram of an example computer that may be configured to function as the first mobile device, the second mobile device, or the server in the system of FIG. 1.

FIG. 7 is a simplified functional block diagram of an example personal computer or other work station or terminal device.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various techniques and approaches disclosed herein relate managing information about content transmission. When content is shared between two or more mobile devices via a short-range radio connection between the two or more mobile devices, a network connection of at least one of the two or more mobile devices may be used to notify a server that the content was shared. The network connection may be different from the short-range radio connection. For example, the network connection is a cellular connection accessible via a cellular radio on the device and the short-range radio connection is a near field communication (NFC) connection accessible via a NFC radio on the device. The server may store information about the shared content and information related to the sharing of the content, for example about device(s) that shared the content. The information about the device(s) may include a device type, a device make and model, a device identifier, etc. The server may analyze the information about the shared content or the information related to the sharing of the content to financially charge or compensate providers of shared content or to learn about types of content that are viral, popular, or prone to sharing.

Figure 1:
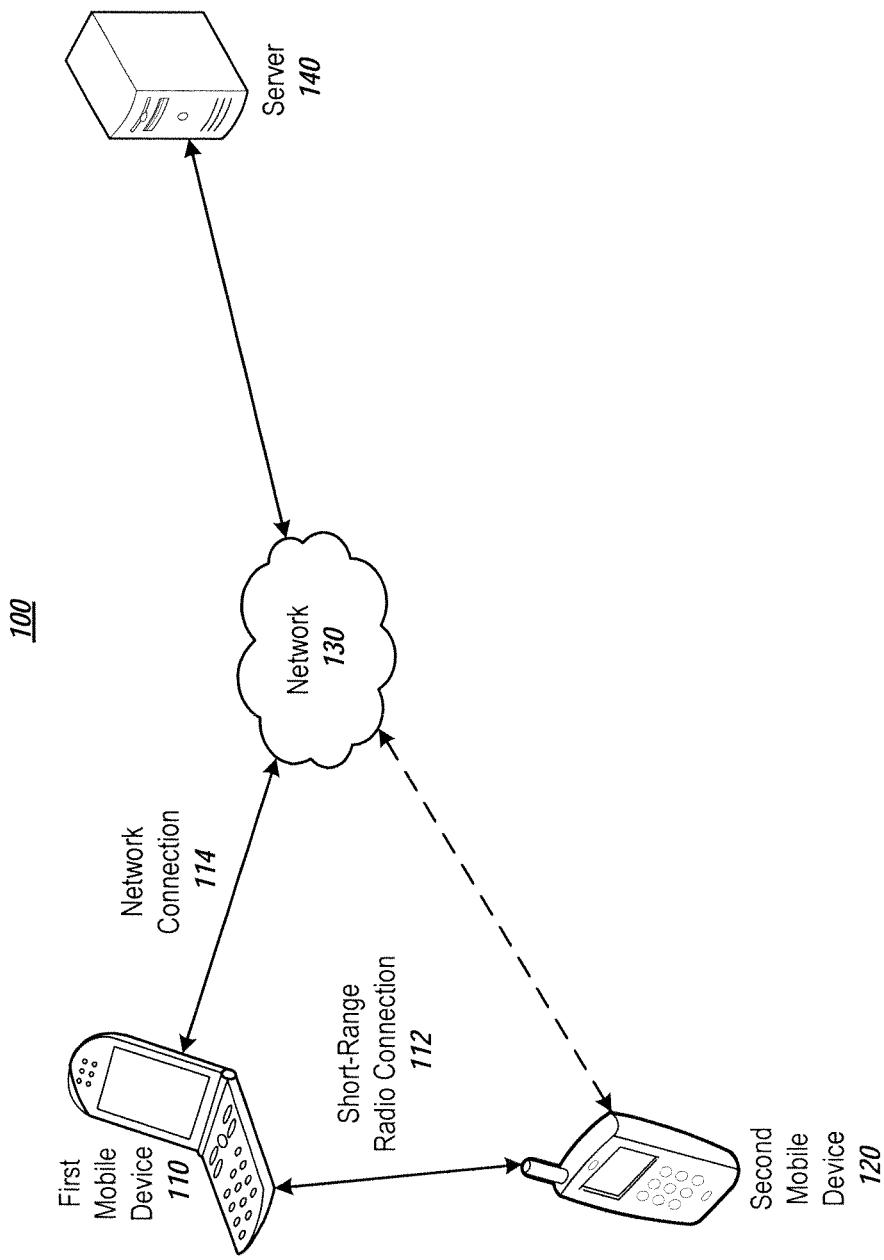
FIG. 1 is a block diagram of an example system configured to manage information about content transmission.

FIG. 1 is a block diagram of an example system 100 configured to manage information about content transmission. As shown, the system 100 includes a first mobile device 110, a second mobile device 120, and a server 140. The first mobile device 110, the server 140, and, in some cases, the second mobile device 120 are connected to a network 130. In other cases, the second mobile device 120 is not connected to the network 130. Each of the first mobile device 110 or the second mobile device 120 may be one of a mobile phone, a digital music player, a personal digital assistant (PDA), a tablet computer, a laptop computer, etc. The network 130 may be the Internet, a cellular network, a local area network, or a wide area network.

In one example, the network 130 is operated by a mobile carrier or a service provider that is connected to Internet. The network 130 is configured to provide a wide range of mobile communication services and ancillary services or features to its subscriber customers and associated mobile devices 110, 120. Although not shown, the system 100 may be implemented by a number of interconnected networks. Hence, the system 100 may include a number of radio access networks ("RANs"), as well as regional ground networks interconnecting a number of RANs and a wide area network ("WAN") interconnecting the regional ground networks to core network elements. A regional portion of the system 100, such as that serving mobile devices 110, 120 will typically include one or more RANs and a regional circuit and/or packet switched network and associated signaling network facilities.

Physical elements of a RAN operated by one of the mobile service providers or carriers include a number of base stations. Although not separately shown, such a base station typically comprises a base transceiver system ("BTS") which communicates via an antennae system at the site of base station and over the airlink with one or more of the mobile devices 110, 120, when the mobile devices are within range. Each base station typically includes a BTS coupled to several antennas mounted on a radio tower within a coverage area often referred to as a "cell." The BTS is the part of the radio network that sends and receives RE signals to/from the mobile stations that the base station currently serves. The user communications for the mobile devices 110, 120 is carried from the base stations 19 to the network 130 and from network 130 to other elements of the system 100 such as the server 140.

The server 140 may be a multiprocessor machine, a single processor machine, or a server farm including multiple machines. The server 140 is connected to the network 130 is configured to receive, via the network 130, and store information related to sharing of content and to analyze the stored information. The server 140 is described in greater detail below, for example, in conjunction with the description of FIG. 3.

The first mobile device 110 is connected to the second mobile device 120 via a short-range radio connection 112 and to the network 130 via a network connection 114. The short-range radio connection 112 may be, for example, a NFC connection, a Bluetooth® connection, a shared local area network connection (e.g., a WiFi router to which both the first mobile device 110 and the second mobile device 120 are connected), etc. The network connection 114 may be any connection for connecting to a network, for example, a cellular connection to a cellular tower or a WiFi connection to a WiFi router coupled with a modem for accessing the Internet. The network connection 114 is different from the short-range radio connection 112.

According to some implementations, the first mobile device 110 sends content to the second mobile device 120 or receives content from the second mobile device 120, via the short-range radio connection 112. The content may be a coupon, a picture, an audio file, a video file, a word processing document, an application, a game, an electronic contact or business card, a calendar notification or invite, etc. The first mobile device 110, which can be either the sender or the recipient of the content transmitted via the short-range radio connection 112, tags the content with a tag, where the tag identifies the second mobile device 120. In some examples, the first mobile device 110 is a mobile device associated with a specific carrier (e.g., Verizon®). The first mobile device 110 transmits to the server 140, via the network connection 114 to the network 130, data identifying the content and the second mobile device 120. The server 140 stores the data. The data may identify the content and may also identify whether the content was sent to the first mobile device 110 from the second mobile device 120 or whether the content was sent from the first mobile device 110 to the second mobile device 120. The tag and/or data may also contain additional pieces of information, such as transmission time to the second mobile device 120 and originator (e.g., the first mobile device 110, a device having sent the content to the first mobile device 110, etc. . . . ). In some embodiments, the additional information in the tag and data at least partially overlap while in other embodiments the additional information sent in the tag and the data sent to the server 140 do not overlap. In some examples, when the content is transmitted to from device to device, the knowledge about the historic path the content has taken will be passed on from device to device. Furthermore, the tag, that may resemble a string (dynamic array) of data, will be pushed through the network for the purpose of collecting data insights, every time this kind of tag is recognized upon receipt of content.

Figure 2:
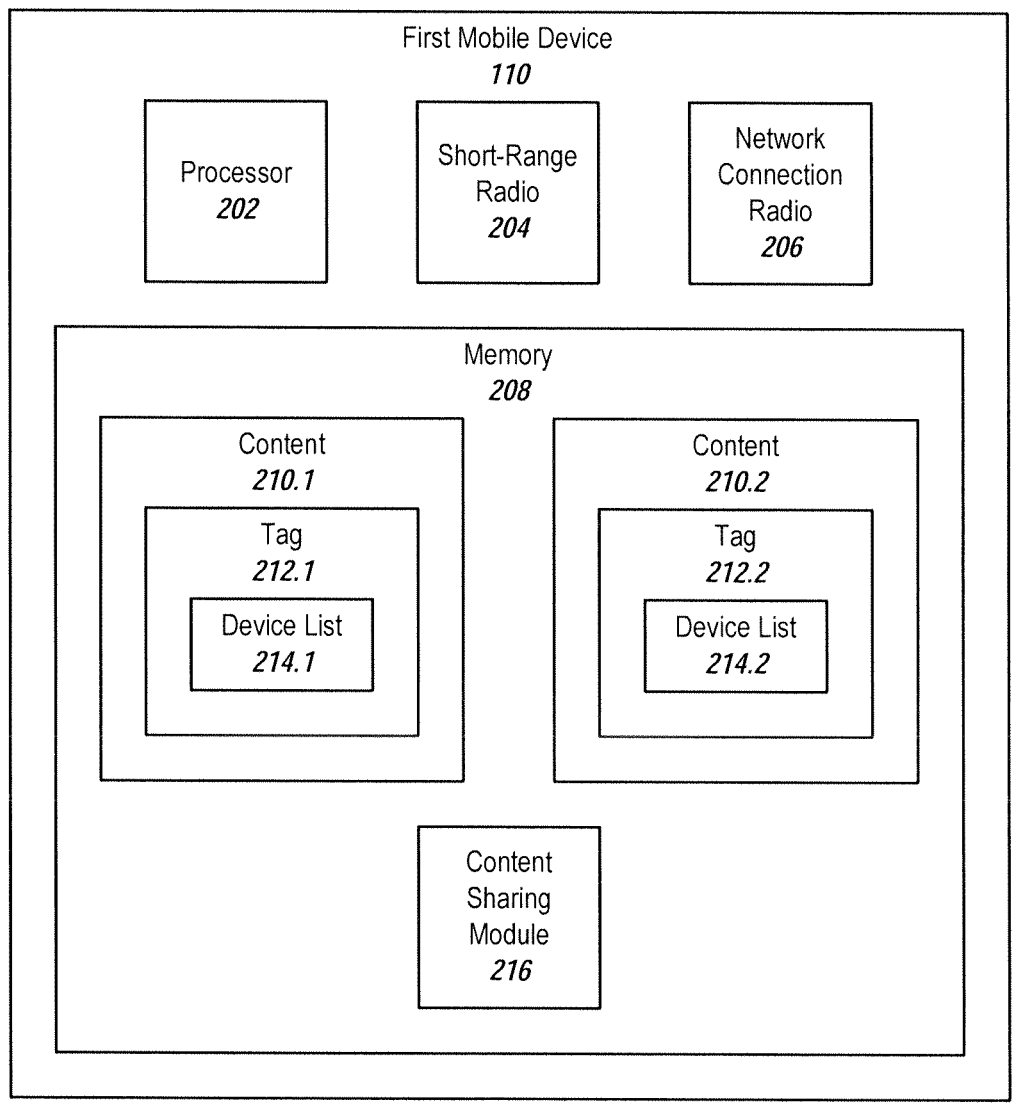
FIG. 2 is a block diagram illustrating an example of the first mobile device of FIG. 1 in greater detail.

FIG. 2 is a block diagram illustrating an example of the first mobile device 110 of FIG. 1 in greater detail. As shown, the first mobile device 110 includes a processor 202, a short-range radio 204, a network connection radio 206, and a memory 208. The processor 202 is configured to execute instructions stored in a machine-readable medium, for example, the memory 208. While a single processor 202 is illustrated, the first mobile device 110 may include a single processor 202 or multiple processors 202. The short-range radio 204 is configured to transmit information wirelessly over short distances, for example, not greater than 200 meters, 100 meters, 10 meters, 1 meter, 0.25 meters, 0.1 meters, etc. In some examples, the short-range radio 204 is a NFC radio. Alternatively, the short-range radio may be a Bluetooth® radio, a WiFi radio, or any other short-range radio configured for short range communication. The network connection radio 206 is configured to allow the first mobile device 110 to connect to a network (e.g., network 130) and to send or receive data via the network. The network connection radio 206 may include one or more network interface cards (NICs). In some examples, the network connection radio 206 is a cellular radio configured to with the network 130 via one or more base stations. Alternatively, the network connection radio 206 may be a WiFi radio, a satellite radio, or any other radio for connecting to a network. In some examples, the short-range radio 204, the network connection radio 206, or both may be replaced with wired connections (e.g., a short-range wired connection or an Ethernet wired network connection). The memory 208 stores data and/or instructions. As shown, the memory 208 includes content 210.1 and 210.2 and a content sharing module 216.

Although the memory 208 of the first mobile device 110 is shown to store two pieces of content 210.1 and 210.2, the memory may also store additional content. Each content 210.$k$ (where k is a number between 1 and 2) may represent any type of content, for example, a coupon, a photograph, an audio file, a video file, an application, a word processing document, etc. In some examples, the content 210.1 and 210.2 (e.g., coupons or photographs) are stored within an application or a library for storing content. As shown, each content 210.$k$ includes a tag 212.$k$. The tag 212.$k$ may be, for example, a NFC tag. As shown, the tag 212.$k$ includes a device list 214.$k$. The device list 214.$k$ includes device(s) to which the content 210.$k$ has been transmitted. The information in the device list 214.$k$ can be obtained from a device from which the first mobile device 110 received the content 210.$k$ and updated, by the first mobile device 110, when the first mobile device 110 transmits the content 210.$k$ to an external device. In some examples, the device list 214.$k$ identifies only the device(s) involved in a current transmission of the content (e.g., the first mobile device 110 and the second mobile device 120). In some examples, the device list 214.$k$ identifies each of the device(s) to which the content 210.$k$ was transmitted since a creation of the content 210.$k$. For example, the content 210.$k$ could be a coupon for 10% off ground coffee at a supermarket, which was originated in a NFC reader residing in a coffee shop. The mobile device 110 may read the coupon from the NFC reader, and share the coupon with the mobile device 120, which may later share the coupon with a third mobile device in response to a user input, at the mobile device 120, for sharing the coupon with the third mobile device. The user input can be received using one or more of a touch screen, a keyboard, a mouse, or a microphone. The sharing may take place either via the network 130 or via the short-range radio communication. Upon reaching the third mobile device, the device list 214.$k$ may either include only the identities of the mobile devices 120 and the third mobile device or the identities of the NFC reader residing in the coffee shop (from which the mobile device 110 read the coupon), the mobile device 110, the mobile device 120, and the third mobile device.

In some examples, the content sharing module 216 is implemented in software and includes code to send to a second mobile device (e.g., second mobile device 120) or receive from the second mobile device, via the short-range radio 204, content (e.g., content 210.$k$). The content sharing module 216 includes code to tag the content with a tag (e.g., tag 212.$k$), where the tag identifies the second mobile device. The content sharing module 216 includes code to transmit to a server (e.g., server 140), via the network connection radio 206 and the network 130, data identifying the content and the second mobile device (e.g., a name or identifier of the content and the device list 214.k). In some examples, the content sharing module 216 is implemented in hardware or a combination of software and hardware, and includes hard-wired logic, rather than code, for one or more of the above steps.

Figure 3:
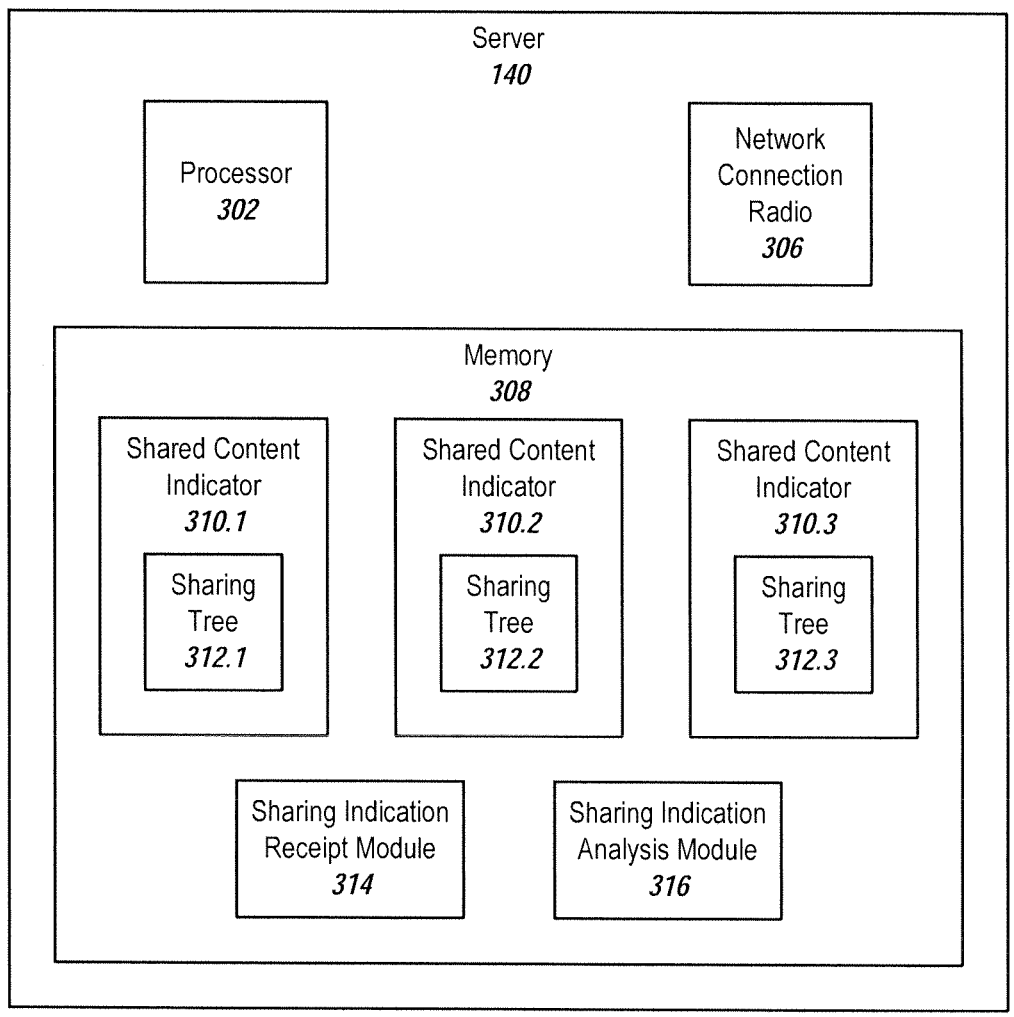
FIG. 3 is a block diagram illustrating an example of the server of FIG. 1 in greater detail.

FIG. 3 is a block diagram illustrating an example of the server 140 of FIG. 1 in greater detail. As shown, the server 140 includes a processor 302, a network connection radio 306, and a memory 308. The processor 302 is configured to execute instructions stored in a machine-readable medium, for example, the memory 308. While a single processor 302 is illustrated, the server 140 may include a single processor 302 or multiple processors 302. The network connection radio 306 is configured to allow the server 140 to connect to a network (e.g., network 130) and to send or receive data within the network. The network connection radio 306 may include one or more network interface cards (NICs). In some examples, the network connection radio 306 is a cellular radio. Alternatively, the network connection radio 306 may be a WiFi radio, a satellite radio, or any other radio for connecting to a network. In some examples, the network connection radio 306 may be replaced with a wired network connection (e.g., an Ethernet wired network connection). The memory 308 stores data and/or instructions. As shown, the memory 308 includes shared content indicators 310.1-3, a sharing indication receipt module 314, and a sharing indication analysis module 316.

While three shared content indicators 310.1-3 are illustrated, the subject technology could be implemented with any number of shared content indicators. The shared content indicator 310.k (where k is a number between 1 and 3) identifies a content (e.g., a coupon) that was shared. Each shared content indicator 310.k includes a sharing tree 312.k. The sharing tree 312.k stores information about the sharing of the content. For example, the sharing tree 312.k could store that a coupon was obtained at mobile device A from a NFC reader in coffee shop. Mobile device A transmitted the coupon to mobile device B, which transmitted the coupon to mobile devices C and D. Mobile device C transmitted the coupon to mobile device E. Each of the mobile devices A, B, C, D, or E could be identified by an identification number, a serial number, a mobile device type, a mobile device make and model, etc.

In some implementations, timing and geographic information about sharing of content 210.k can also be stored in the tag 212.k. The timing information can indicate a time of day when the content 210.k is shared or a time since the creation of the content 210.k when the content 210.k is shared. The geographic information can indicate the geographic location(s) where the content 210.k is shared. Content may be considered more viral if the content is shared a longer time after its creation or a further distance from an original geographic location of the content. In some aspects, a content 210.k can be modified if a particular threshold is reached. For example, the content 210.k can originally be a 10% discount coupon. If the coupon is shared with at least 1000 devices, the coupon can become a 15% off coupon. If the coupon is shared with 5000 devices in at least five different states of the United States, the coupon can become a 20% off coupon. With appropriate permission of a user storing the coupon on his/her mobile device, the user can be notified of changes to the coupon via an electronic message (e.g., an email message, a short messaging service (SMS) message, or a message pushed to the mobile device of the user).

The sharing indication receipt module 314 may be implemented in software. The sharing indication receipt module 314 may include code to receive, from a mobile device (e.g., first mobile device 110) an indication that content (e.g., a content associated with one of the shared content indicators 310.1-3) was shared and to store the indication (e.g., in one of the sharing trees 312.1-3). In some examples, the content may be a coupon of a merchant (e.g., $1 discount on coffee at a coffee shop). Upon receiving the indication that the content was shared (e.g., sent from or received at a mobile device), the server may cause a business associated with the server (e.g., a mobile device manufacturer, a cellular service provider, or a mobile device software application developer) to receive compensation from the merchant responsive to the sharing of the coupon. In some aspects, a device that has shared the content may also receive compensation from the merchant. The compensation received at the device that has shared the content can include one or more of monetary compensation, additional coupons, or reward points (e.g., airline reward miles or reward points that can be redeemed for merchandise at one or more shops). In some examples, the sharing indication receipt module 314 is implemented in hardware or a combination of software and hardware and includes logic in addition to or in place of code.

The sharing indication analysis module 316 may be implemented in software. The sharing indication analysis module 316 may include code to analyze the shared content indicated by the indicators 310.1-3 and/or the sharing trees 312.1-3 to determine information about content that users like to share (e.g., content that is shared vs. content that is not shared, or content that is shared with multiple other user vs. content that is shared with a single other user). For example, if the content are coupons, the sharing indication analysis module 316 may determine that coupons for popular business, coupons for luxury items, colorful coupons, coupons including a large number of images and little text, etc., are more likely to be shared than other coupons. This information may be useful for merchants creating coupons that the merchants hope will be shared. In some examples, the sharing indication analysis module 316 is implemented in hardware or a combination of software and hardware and includes logic in addition to or in place of code.

Figure 4:
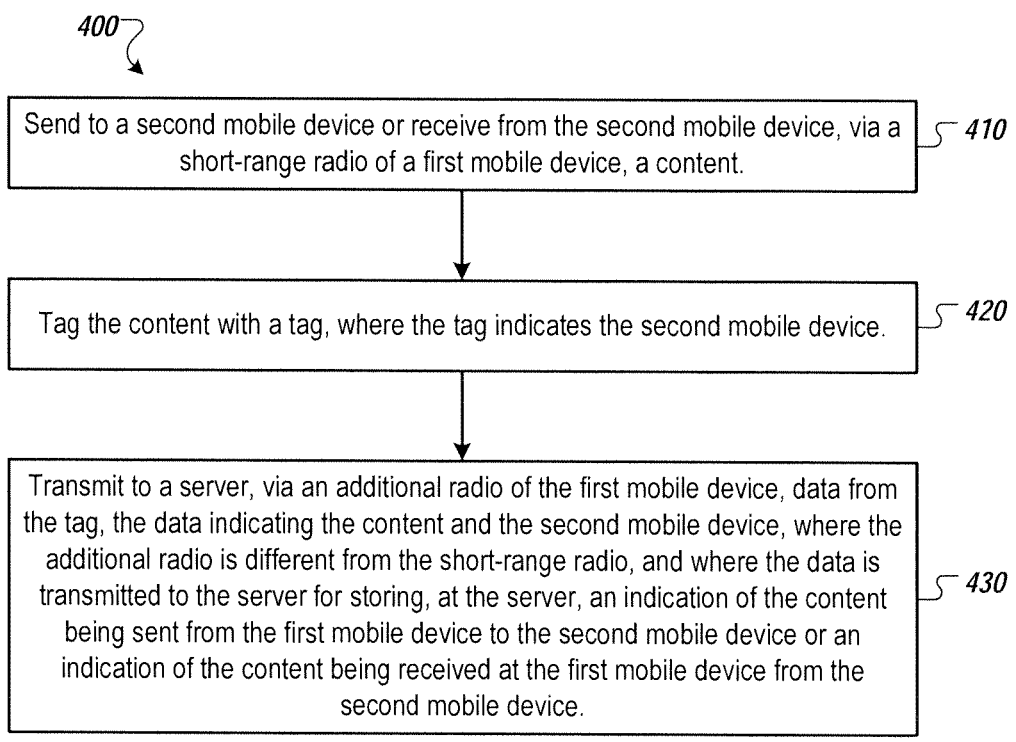
FIG. 4 is a flow chart of an example process for managing information about content transmission.

FIG. 4 is a flow chart of an example process 400 for managing information about content transmission. The process 400 begins at step 410, where a first mobile device (e.g., first mobile device 110) sends to a second mobile device (e.g., second mobile device 120) or receives from the second mobile device, via a short-range radio (e.g., short-range radio 204) of the first mobile device, a content (e.g., content 210.k, which may be a coupon, a photograph, an audio file, a video file, an application, etc.). The short-range radio may be, for example, a NFC radio, a Bluetooth® radio, a WiFi radio (e.g., where the first mobile device and the second mobile device are connected to a common WiFi router), etc.

In step 420, the first mobile device tags the content with a tag (e.g., tag 212.k), where the tag identifies the second mobile device to which the content was sent or from which the content was received in step 410. The tag could include information about the second mobile device (e.g., device type, device make and model, etc.) or an identifier (e.g., serial number, telephone number, International Mobile Station Equipment Identity (IMEI) number, etc.) of the second mobile device. A new tag could be added to the content or an existing tag that is already associated with the content may be modified. The tag could be implemented using one or more known data structure(s), where the data structure(s) include array(s), linked list(s), stack(s), queue(s), etc. The tag can be stored within the content or coupled with the content. The tag can include any information, for example, a time of content sharing via the short-range radio connection, a geographic location of the sharing, or a type of content (e.g., coupon, video file, photograph, application, calendar event, etc.) that was shared. In some examples, the tagging process includes a concatenation of sharing history or sharing activity and a serial number that uniquely identifies the tagged content. As a result, the tag can be maintained if the content is shared between devices of multiple different carriers (e.g., a Verizon® device shares a content with a Sprint® device, which shares the content with a different Verizon® device).

In step 430, the first mobile device transmits to a server (e.g., server 140), via an additional radio (e.g., network connection radio 206, which may be, for example, a cellular radio) of the first mobile device, data from the tag, the data indicating the content and the second mobile device. The additional radio is different from the short-range radio, transmitting over a different network. The data is transmitted to the server for storing, at the server, an indication of the content being sent from the first mobile device to the second mobile device or an indication of the content being received at the first mobile device from the second mobile device.

In some examples, the additional radio is a cellular radio. The data indicating the content and the second mobile device may be transmitted to the server upon detecting, via the additional radio, a connection to a cellular network associated with a specific carrier. For example, the specific carrier may be a default carrier of the mobile device. The content may be shared while the mobile device is in a roaming geographic location using a cellular network with a carrier other than the default carrier or in a geographic location that lacks cellular coverage. Upon detecting, via the additional radio, cellular coverage by the default carrier, the mobile device may transmit, to the server, the data indicating the content and the second mobile device. As a result, roaming data usage or attempting to access a cellular network when one is not available may be avoided.

Figure 5:
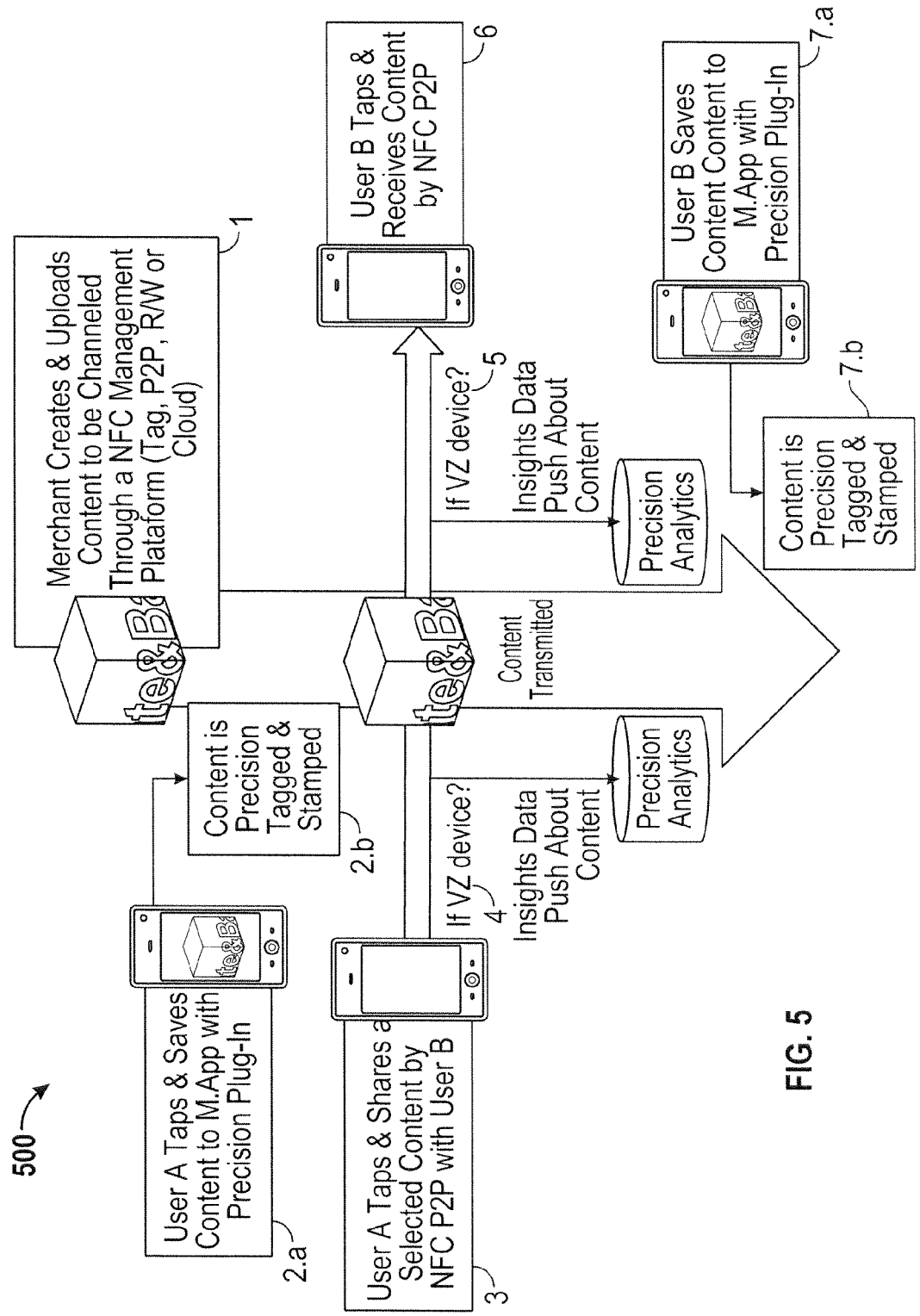
FIG. 5 is a data flow diagram illustrating an example data flow in managing information about content transmission.

FIG. 5 is a data flow diagram illustrating an example data flow 500 in managing information about content transmission. At point 1 of the data flow 500, a merchant (e.g., Crate and Barrel) creates and uploads content to be channeled through a NFC management platform. The NFC management platform may include tag, peer to peer (P2P), read/write (R/W), or cloud computing. The content may be, for example, a coupon or a link to a mobile application or webpage of the merchant.

At point 2.a of the data flow 500, a user of a first mobile device (User A) taps and saves content to a NFC sharing mobile application (M. App with Precision Plug-In) at the first mobile device. At point 2.b of the data flow 500, the content is tagged to indicate that the content has been uploaded to the first mobile device from the merchant.

At point 3 of the data flow 500, the user of the first mobile device (User A) taps and shares the content by NFC P2P with a second mobile device (belonging to User B). At point 4 of the data flow 500, if the first mobile device is a device associated with a specific carrier (e.g., a Verizon device, where Verizon is a cellular carrier) data about the sharing of the content between the first mobile device and the second mobile device is transmitted to the server (Precision Analytics database). The content is transmitted to the second mobile device.

At point 5 of the data flow 500, if the second mobile device is a device associated with the specific carrier (e.g., a Verizon device) data about the sharing of the content between the first mobile device and the second mobile device is transmitted to the server (Precision Analytics database). The content is transmitted to the second mobile device. At point 6 of the data flow 500, the user of the second mobile device (User B) taps and receives the content by NFC P2P from the first mobile device.

At point 7.a of the data flow 500, the user of the second mobile device (User B) taps and saves the content to the NFC sharing mobile application (M. App with Precision Plug-In) at the second mobile device. At point 7.b of the data flow 500, the content is tagged to indicate that the content has been uploaded to the second mobile device from the first mobile device.

In some examples, the subject technology relates to a content tagging solution that may be integrated into mobile application(s) via a software development kit (SDK) plug-in, such as Photo Gallery, Video Album or a paying third party application which renders file storage. The tagging SDK may insert an encrypted unique key identifier, including data that notates the origins (creation) of the tag, if it the first instance of NFC content sharing activity. If the NFC shared content has already been initially tagged, hence it is not the first instance of a specific content shared, the SDK may stamp the tag with additional data insights (e.g., device identity or device type information of the devices involved in the NFC transmission, geographic location information, current time information, etc.) regarding the outbound or inbound NFC trigger and transmission of the content.

In some examples, the subject technology relates to a tag detection algorithm that may reside on the application processor that activates the NFC controller chip inside a device to execute a peer to peer (P2P) or read/write (R/W) activity. On either or both outbound or inbound NFC shared content, the tag detection algorithm is able to detect a tag generated by the content tagging solution (outlined above) and decrypt the contents of the tag (data insights). The data insights may be pushed through a cellular network to a server for further data analysis.

As a result of some examples of the subject technology, a market insight tool for collecting viral insights and traffic data that internal and external to the network (such as trends and reach of shared content) triggered by NFC engagement, such Peer to Peer (P2P) sharing and read/write (R/W) sharing is provided. Some implementations of the subject technology may be embedded into third party mobile applications to allow various NFC (or other short-range radio) sharable content to be analyzed using the techniques described herein.

The subject technology, in some examples, enables NFC triggered user traffic to be routed through a cellular network (see points 4 and 5 of the data flow 500 of FIG. 5) for instance, for monetization or revenue generating purposes on future services rendered by a cellular service provider (e.g., mobile campaign delivery, mobile campaign delivery surveillance and consumer behavioral insights). In some cases, without the subject technology, NFC peer to peer and read/write sharing of content may be undetected, not consistently routed through the network, and consequently less effective as a viral campaigning service offering.

The subject technology may be used in, among other implementations, a coupon storing mobile application. The mobile application may render the coupon in a form similar to a photograph album application rendering a photograph, where the coupons may be a collection of files (e.g., image files). The user of the mobile application has the opportunity to share coupon(s) stored on his/her mobile device using NFC peer to peer sharing or other short-range radio sharing technologies. As a result, discoverability and viral traffic may be encouraged. Discoverability can refer to ease of finding content (e.g., a coupon) and is encouraged as users of mobile devices are encouraged to share content with their contacts using NFC peer to peer sharing. Viral traffic refers to content being shared across multiple devices, e.g., devices exceeding a threshold number, e.g., 1000, of devices. Viral traffic is encouraged because users are encouraged to share content with one another. The subject technology may be implemented by a single cellular carrier or in a collaboration across multiple cellular carriers. In some implementations of the subject technology, merchants have an additional mobile marketing opportunity and an opportunity to track the viral distribution of their content (e.g., promotions, coupons, advertisements, etc.). As a result, merchants are able to learn which of their content is most popular, most interesting, or most shared through various distribution channels (overall and by channel). In some examples, a provider of an application for sharing content (e.g., coupons) from merchants may be compensated by the merchants based on an amount of content shared for the merchant. The merchant may compensate the provider by a constant amount (e.g., $0.05 per item shared) or by a variable amount depending on a number of items shared (e.g., $0.06 per item shared for the first 10,000 items shared, and $0.03 per item shared thereafter). The provider may notify the merchant or one or more mobile device users of the number of items shared. The notifications can be provided, for example, via email short messaging service (SMS), or messages(s) pushed to mobile device(s).

As shown by the above discussion, functions relating to managing information about content transmission may be implemented on computers connected for data communication via the components of a packet data network. Although special purpose devices may be used, such devices also may be implemented using one or more hardware platforms intended to represent a general class of data processing device commonly used to run programming so as to implement the functions discussed above.

As known in the data storage and retrieval field, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the content media editing. The software code is executable by the general-purpose computer that functions as the first mobile device 110, the second mobile device 120, or the server 140. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for allowing the user to edit media content to an acceptable size for successful transmission over the network, in essentially the manner performed in the implementations discussed and illustrated herein.

Some implementations described herein include, among other things, a server or a data repository (e.g., a database) storing information about a mobile device of an end-user. In some examples, the user affirmatively provides permission for the server or the data repository to store information about his/her mobile device, for example, in exchange for the server or data repository providing rewards (e.g., reward points that can be exchanged for merchandise or services) to the user's mobile device. The user may withdraw his/her permission for the server or data repository to store this information at any time, in which case the server and the data repository permanently delete any information about the user or the user's device(s) stored thereon. In other words, the user can opt into or opt out of the server and data repository storing information about his/her mobile device(s). To the extent the aforementioned embodiments collect, store or employ personal information provided by individuals, it should be understood that such information shall be used in accordance with all applicable laws concerning protection of personal information. Thus, as described, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The user may be provided with periodic reminders that information about his/her devices is being stored at the server. The reminders may be provided by electronic messages (e.g., an email or short messaging service message provided every 11 days) or via an application on the mobile device. For example, the application may allow the user to view information about his/her mobile device that is stored at the server or at the data repository or the application may provide periodic reminders (e.g., every m times that the user accesses the application) to the user that information about his/her device is being transmitted to the server.

In some examples, data stored at the server or at the data repository is anonymized and cannot be associated with any specific user or mobile device. For example, a device type (e.g., Apple iPhone®) can be stored in place of an identification number (e.g., International Mobile Station Equipment Identity (IMEI) number) or a telephone number of the device. As a result, user privacy may be protected while allowing the server or the data repository to collect information related to sharing of content via short-range radio.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that the general structure and general operation of such equipment as shown in FIGS. 6 and 7 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 7). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the methods of managing information about content transmission outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the application(s) 150, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In some aspects, the subject technology relates to a method, implemented at a first mobile device, for managing information about content transmission. The method includes communicating with a second mobile device via a short-range radio of the first mobile device to either send or receive content. The method includes tagging the content with a tag identifier, the tag identifier identifying the second mobile device. The method includes transmitting to a server, via an additional radio of the first mobile device, data from the tag identifier, the data identifying the content item and the second mobile device, where the additional radio used for transmitting the data is different from the short-range radio used for communicating the content.

In some examples, communicating with the second mobile device includes receiving the content from the second mobile device content at the first mobile device, and the transmitted data to the server identifies the content is received from the second mobile device and at the first mobile device.

In some examples, communicating with the second mobile device includes sending the content from the first mobile device to the second mobile device, and the transmitted data to the server identifies the content that is sent from the first mobile device to the second mobile device.

In some examples, the short-range radio is a NFC radio and the additional radio is a cellular radio. In some examples, the data is transmitted to the server upon detecting, via the additional radio, a connection to a cellular network associated with a specified carrier.

In some examples, the content includes a coupon associated with a merchant.

These general and specific aspects may be implemented using a system, a method, a computer program, a computer readable medium, or an apparatus or any combination of systems, methods, computer programs, computer readable mediums, and/or apparatuses.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, implemented at a first mobile device, for managing information about content transmission, the method comprising:
    communicating with a second mobile device via a short-range radio of the first mobile device to either send or receive content;
    tagging, at the first mobile device and after the communicating with the second mobile device, the content with a tag identifier, wherein the tag identifier identifies the content and the second mobile device and includes information related to the communicating with the second mobile device; and
    transmitting to a server, via an additional radio of the first mobile device, data from the tag identifier, wherein the additional radio used for transmitting the data is different from the short-range radio used for communicating the content, wherein the data is transmitted to the server to enable the server to analyze short-range radio transmissions between the first mobile device and the second mobile device, and wherein the server is outside of an access range of the short-range radio of the first mobile device.

2. The method of claim 1, wherein:
    communicating with the second mobile device includes receiving the content from the second mobile device content at the first mobile device, and the transmitted data to the server identifies the content is received from the second mobile device and at the first mobile device; or
    communicating with the second mobile device includes sending the content from the first mobile device to the second mobile device, and the transmitted data to the server identifies the content that is sent from the first mobile device to the second mobile device.

3. The method of claim 1, wherein the short-range radio comprises a near field communication (NFC) radio and the additional radio comprises a cellular radio.

4. The method of claim 3, wherein the data is transmitted to the server in response to detecting, via the additional radio, a connection to a cellular network associated with a specified carrier.

5. The method of claim 1, wherein the content comprises a coupon associated with a merchant.

6. The method of claim 1, wherein enabling the server to analyze the short-range radio transmissions between the first mobile device and the second mobile includes enabling the server to identify a number of times the content is communicated between the first mobile device and the second mobile device, thereby allowing the server to receive compensation from a merchant associated with the content based on the identified number of times the content is communicated between the first mobile device and the second mobile device.

7. The method of claim 1, wherein analyzing short-range radio transmissions between mobile devices comprises:
    storing, for a specified content, a set of times and a set of geographic locations where the specified content was sent or received via short-range radio; and
    providing a representation of the set of times and the set of geographic locations.

8. The method of claim 7, wherein the representation of the set of times and the set of geographic locations is provided to a creator of the specified content.

9. The method of claim 8, wherein analyzing short-range radio transmissions between mobile devices further comprises:
    engaging in a financial transaction having a monetary amount, wherein the monetary amount is determined based on the set of times and the set of geographic locations, and wherein the financial transaction is engaged in using one or more computing machines.

10. A non-transitory machine-readable medium for managing information about content transmission, the machine-readable medium storing instructions for a machine to:
    communicate with a second mobile device via a short-range radio of the first mobile device to either send or receive content;
    tag, at the first mobile device and after the communicating with the second mobile device, the content with a tag identifier, wherein the tag identifier identifies the content and the second mobile device and includes information related to the communicating with the second mobile device; and
    transmit to a server, via an additional radio of the first mobile device, data from the tag identifier, wherein the additional radio used for transmitting the data is different from the short-range radio used for communicating the content, and wherein the data is transmitted to the server for analyzing short-range radio transmissions between mobile devices.

11. The machine-readable medium of claim 10, wherein:
    the instructions to communicate with the second mobile device include instructions to receive the content from the second mobile device content at the first mobile device, and the transmitted data to the server identifies the content is received from the second mobile device and at the first mobile device; or
    the instructions to communicate with the second mobile device include instructions to send the content from the first mobile device to the second mobile device, and the transmitted data to the server identifies the content that is sent from the first mobile device to the second mobile device.

12. The machine-readable medium of claim 10, wherein the short-range radio comprises a near field communication (NFC) radio and the additional radio comprises a cellular radio.

13. The machine-readable medium of claim 12, wherein the data is transmitted to the server in response to detecting, via the additional radio, a connection to a cellular network associated with a specified carrier.

14. The machine-readable medium of claim 10, wherein the content comprises a coupon associated with a merchant.

15. The machine-readable medium of claim 10, wherein analyzing short-range radio transmissions between mobile devices comprises:
   storing, for a specified content, a number of times the specified content was sent or received via short-range radio; and
   receiving, from a merchant associated with the specified content, a compensation based on the number of times the specified content was sent or received via short-range radio, wherein the compensation is received using one or more computing machines.

16. The machine-readable medium of claim 10, wherein analyzing short-range radio transmissions between mobile devices comprises:
   storing, for a specified content, a set of times and a set of geographic locations where the specified content was sent or received via short-range radio; and
   providing a representation of the set of times and the set of geographic locations.

17. The machine-readable medium of claim 10, wherein the representation of the set of times and the set of geographic locations is provided to a creator of the specified content.

18. The machine-readable medium of claim 10, wherein analyzing short-range radio transmissions between mobile devices further comprises:
   engaging in a financial transaction having a monetary amount, wherein the monetary amount is determined based on the set of times and the set of geographic locations, and wherein the financial transaction is engaged in using one or more computing machines.

19. A first mobile device comprising:
   a short-range radio;
   an additional radio different from the short-range radio;
   one or more processors; and
   a memory comprising instructions which, when executed by the one or more processors, cause the one or more processors to:
      communicate with a second mobile device via the short-range radio to either send or receive content;
      tag, at the first mobile device and after the communicating with the second mobile device, the content with a tag identifier, wherein the tag identifier identifies the content and the second mobile device and includes information related to the communicating with the second mobile device; and
      transmit to a server, via the additional radio, data from the tag identifier, wherein the data is transmitted to the server for analyzing short-range radio transmissions between mobile devices.

20. The first mobile device of claim 19, wherein:
   the instructions to communicate with the second mobile device include instructions to receive the content from the second mobile device content at the first mobile device, and the transmitted data to the server identifies the content is received from the second mobile device and at the first mobile device; or
   the instructions to communicate with the second mobile device include instructions to send the content from the first mobile device to the second mobile device, and the transmitted data to the server identifies the content that is sent from the first mobile device to the second mobile device.

21. The method of claim 1, wherein the content has been communicated between multiple mobile devices, including the first mobile device and the second mobile device, and wherein the information related to the communicating with the second mobile device, included within the tag identifier, comprises a device list of the multiple mobile devices between which the content has been communicated.

* * * * *